United States Patent
Bastos et al.

(10) Patent No.: US 7,821,520 B1
(45) Date of Patent: Oct. 26, 2010

(54) FRAGMENT PROCESSOR HAVING DUAL MODE REGISTER FILE

(75) Inventors: Rui M. Bastos, Porto Alegre (BR); Karim M. Abdalla, Menlo Park, CA (US); Sean J. Treichler, Mountain View, CA (US); Emmett M. Kilgariff, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 915 days.

(21) Appl. No.: 11/009,471

(22) Filed: Dec. 10, 2004

(51) Int. Cl.
*G09G 5/36* (2006.01)
*G06T 1/20* (2006.01)
*G06F 15/16* (2006.01)

(52) U.S. Cl. .................. 345/559; 345/506; 345/502

(58) Field of Classification Search .......... 345/418, 345/501, 502, 506, 530, 558, 559
See application file for complete search history.

(56) References Cited

U.S. PATENT DOCUMENTS

| | | | |
|---|---|---|---|
| 5,977,977 A * | 11/1999 | Kajiya et al. | 345/418 |
| 5,995,122 A * | 11/1999 | Hsieh et al. | 345/561 |
| 6,339,427 B1 * | 1/2002 | Laksono et al. | 345/553 |
| 6,344,852 B1 * | 2/2002 | Zhu et al. | 345/418 |
| 6,538,656 B1 * | 3/2003 | Cheung et al. | 345/519 |
| 6,734,865 B1 * | 5/2004 | Peterson et al. | 345/544 |
| 7,013,403 B2 * | 3/2006 | Naegle | 713/500 |
| 7,034,828 B1 * | 4/2006 | Drebin et al. | 345/426 |
| 7,176,914 B2 * | 2/2007 | Emmot | 345/418 |

OTHER PUBLICATIONS

Eggers, et al. "Simultaneous Multithreading: A Platform for Next-Generation Processors," IEEE Micro, vol. 17, No. 5, pp. 12-19, Sep./Oct. 1997.

* cited by examiner

*Primary Examiner*—Joni Hsu
(74) *Attorney, Agent, or Firm*—Patterson & Sheridan, LLP

(57) ABSTRACT

A new, useful, and non-obvious shader processor architecture having a shader register file that acts both as an internal storage register file for temporarily storing data within the shader processor and as a First-In First-Out (FIFO) buffer for a subsequent module. Some embodiments include automatic, programmable hardware conversion between numeric formats, for example, between floating point data and fixed point data.

26 Claims, 7 Drawing Sheets

FRAGMENT PROCESSOR HAVING DUAL MODE REGISTER FILE

BACKGROUND OF THE INVENTION

1. Field of the Invention

The present invention relates to computer systems, and more particularly to memory devices used to buffer fragment processor (referred to herein as a shader processor) outputs.

2. Description of the Related Art

Graphics processing is an important feature of modern high-performance computing systems. In graphic processing, mathematical procedures are implemented to render, or draw, graphic primitives, e.g., a triangle or a rectangle, on a display to produce desired visual images. Real time graphics processing is based on the high-speed processing of graphic primitives to produce visually pleasing moving images.

Early graphic systems were limited to displaying image objects comprised of graphic primitives having smooth surfaces. That is, visual textures, bumps, scratches, or other surface features were not modeled in the graphics primitives. To enhance image quality, texture mapping of real world attributes was introduced. In general, texture mapping is the mapping of an image onto a graphic primitive surface to create the appearance of a complex image without the high computational costs associated with rendering actual three dimensional details of an object.

Graphics processing is typically performed using application program interfaces (API's) that provide a standard software interface that can be run on multiple platforms, operating systems; and hardware. Examples of API's include the Open Graphics Library (OpenGL®) and D3DTM. In general, such open application programs include a predetermined, standardized set of commands that are executed by associated hardware. For example, in a computer system that supports the OpenGL® standard, the operating system and application software programs can make calls according to that standard without knowing any of the specifics regarding the system hardware. Application writers can use APIs to design the visual aspects of their applications without concern as to how their commands will be implemented.

APIs are particularly beneficial when they are supported by dedicated hardware. In fact, high-speed processing of graphical images is often performed using special graphics processing units (GPUs) that are fabricated on semiconductor substrates. Beneficially, a GPU can be designed and used to rapidly and accurately process commands with little impact on other system resources.

FIG. 1 illustrates a simplified block diagram of a graphics system 100 that includes a graphics processing unit 102. As shown, that graphics processing unit 102 has a host interface/front end 104. The host interface/front end 104 receives raw graphics data from a central processing unit 103 that is running an application program stored in memory 105. The host interface/front end 104 buffers input information and supplies that information to a geometry engine 106. The geometry engine has access to a frame buffer memory 120 via a frame buffer interface 116. The geometry engine 106 produces, scales, rotates, and projects three-dimensional vertices of graphics primitives in "model" coordinates that are stored in the frame buffer memory 120 into two-dimensional framebuffer co-ordinates. Typically, triangles are used as graphics primitives for three-dimensional objects, but rectangles are often used for 2-dimensional objects (such as text displays).

The two-dimensional frame-buffer co-ordinates of the vertices of the graphics primitives from the geometry engine 106 are applied to a rasterizer 108. The rasterizer 108 identifies the positions of all of the pixels within the graphics primitives. This is typically performed along raster (horizontal) lines that extend between the lines that define the graphics primitives. The output of the rasterizer 108 is referred to as rasterized pixel data.

The rasterized pixel data are applied to a shader processor 110 that processes input data (code, position, texture, conditions, constants, etc) using a shader program (sequence of instructions) to generate output data. While shader processors are described in relation to graphics processing, shader processors are, in general, useful for many other functions. Shader processors can be considered as a collection of processing capabilities that can handle large amounts of data at the same time, such as by parallel handling of data.

The shader processor 110 includes a texture engine 112 that modifies the rasterized pixel data to have the desired texture and optical features. The texture engine 112, which has access to the data stored in the frame buffer memory 120, can be implemented using a hardware pipeline that processes large amounts of data at very high speed. The shaded pixel data is then sent to a Raster Operations Processor 114 (Raster op in FIG. 1) that optionally performs additional processing on the shaded pixel data. The result is pixel data that is stored in the frame buffer memory 120 by the frame buffer interface 116. The frame pixel data can be used for various processes such as being displayed on a display 122.

As shown in FIG. 1, the Shader processor 110 and the Raster Operations Processor 114 are sequential modules. If the Raster Operations Processor 114 stalls, as it may do during normal operation for any number of reasons, the Shader processor will also stall, with obvious system-level performance implications, unless a buffer, say a First-in First-out register, is inserted between the output of the Shader processor 110 and the input of the Raster Operations Processor 114. This is shown in the system 500 of FIG. 5. That system includes a FIFO buffer 502 that is inserted between an optionally multi-ported shader processor register file 504 and a Raster Operations Processor 114. The system 500 includes multiple computation units 506 that communicate through the shader register file 504. Programming instructions are applied via a bus 508, and data is applied to one of the computational units 506 on a bus 510. When the shader processor (elements 504-510) processes data, intermediate results are stored in the shader register file 504. When shader processor operations are completed, data is clocked out of the shader register file 504 into the FIFO buffer 502. When the Raster Operations Processor 114 performs its operations, it can drain data from the FIFO buffer 502. This architecture enables delays between Shader processor and Raster Operations Processor 114 operations without slowdowns or conflicts.

Unfortunately, adding a FIFO buffer 502 to the output of the Shader processor 110 takes up valuable real estate on the substrate on which the Shader processor 110 and/or the Raster Operations Processor 114 is fabricated. That decreases the overall yield of the finished product, driving up costs, increasing heat build-up, and decreasing reliability. Additionally, adding a FIFO buffer 502 increases the already complex design of graphics processors.

Another problem with having a shader processor 110 feed data directly to a Raster Operations Processor 114 is that a shader processor 110 typically processes data in floating point, e.g., 32 bit or 16 bit, format while a Raster Operations Processor 114 typically processes fixed point formatted data. Thus, conversion of the floating point Shader processor 110 output to fixed point values is typically required. This can seriously complicate feeding data into the Raster Operations Processor 114, particularly when a FIFO buffer 502 is inserted between the Shader processor 110 and the Raster Operations Processor 114.

Therefore, a shader design that avoids the necessity of adding a special buffer between the Shader processor and subsequent modules, such as a Raster Operations Processor 114, would be beneficial. Even more beneficial would be a new, high performance programmable shader architecture that enables data buffering within a shader processor. Also beneficial would be a programmable shader architecture that enables data buffering within the shader processor and automatic data format conversion.

SUMMARY OF THE INVENTION

The principles of the present invention provide for new, useful, and non-obvious shader architectures. Embodiments of that shader architecture do not include a buffer between the shader processor and subsequent modules. Some embodiments of the present invention include a shader register file within the shader processor that acts both as an internal buffer file for temporarily storing data within the shader processor and as a First-In First-Out (FIFO) buffer for buffering data to a subsequent module.

Some embodiments of the present invention include automatic, programmable hardware conversions from one numeric format to another, for example, from floating point data to fixed point data. Such data conversions can be programmed as the last step in the shader module, before making the data available to the next module. By storing the multiple 8 bit formatted data in a register file, new data (segments) can be stored in the shader register file, while processed data is still being drained by a subsequent module.

BRIEF DESCRIPTION OF THE DRAWINGS

The foregoing and other aspects and advantages are better understood from the following detailed description of a preferred embodiment of the invention with reference to the drawings, in which.

DETAILED DESCRIPTION

The principles of the present invention provide for a new, useful, and non-obvious shader architecture that does not require a buffer between the shader processor output and subsequent modules. Some embodiments of the present invention include a shader register file that acts both as an internal buffer file for temporarily storing data within the shader processor and as a First-In First-Out (FIFO) buffer for buffering data to a subsequent module. Some embodiments of the present invention include automatic, programmable hardware conversions between numeric formations, for example, from floating point data to fixed point data. Beneficially, fixed point data is packed such that multiple fixed point data sets are stored in a particular register of the shader register file. This enables the shader register file to begin storing new temporary data, while the shader register file is drained by a subsequent module.

To better understand the principles of the present invention it may be helpful to understand shader processors in more detail. Referring back to FIG. 1, the input to a shader processor is rasterized pixel data comprised of two-dimensional display co-ordinates of the vertices of the graphics primitives used in the graphics system. Typically, those graphic primitives are triangles. For example, FIG. 2A illustrates the coordinates (0,0), (1,0), and (1,1) of the vertices that define a graphic primitive triangle 202. If rectangles are used, the additional coordinate (0,1) would be included in the graphics primitive. However, except for 2-dimension objects such as text, triangles are more common.

Figure 2A:
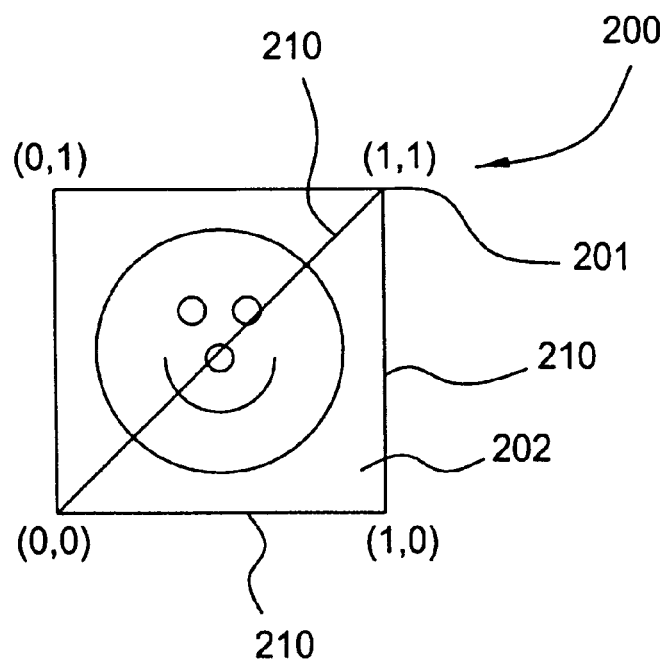
FIG. 2A schematically illustrates a triangle geometric primitive.
Figure 2B:
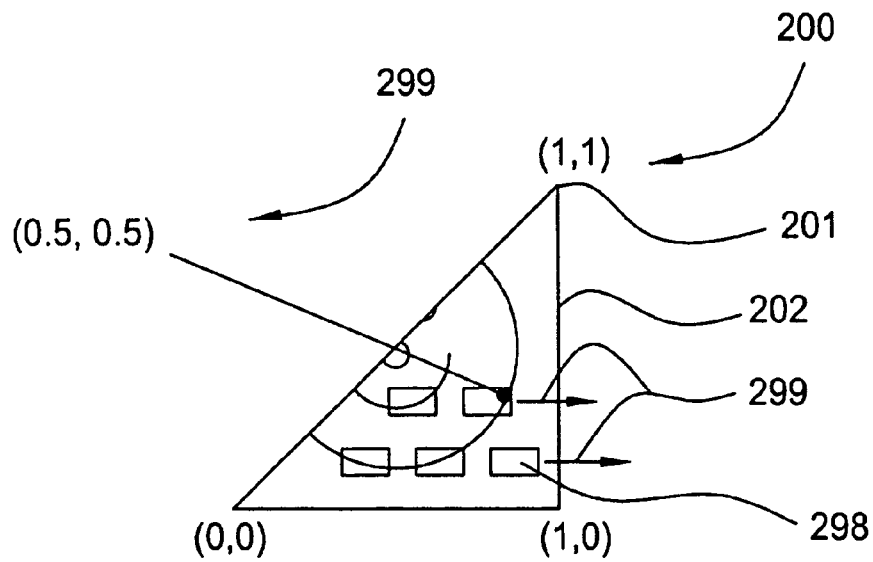
FIG. 2B illustrates a triangle geometric primitive having pixels aligned along each scan line.

Once the vertices 201 of the triangle 202 are known, the pixels within the graphic primitive are determined since they are the pixels located between the lines 210 that form the graphic primitive. Usually the pixels are organized along raster scan lines. For example, FIG. 2B illustrates a plurality of pixels 298 within the triangle 202 that are aligned by scan lines 299.

Figure 3:
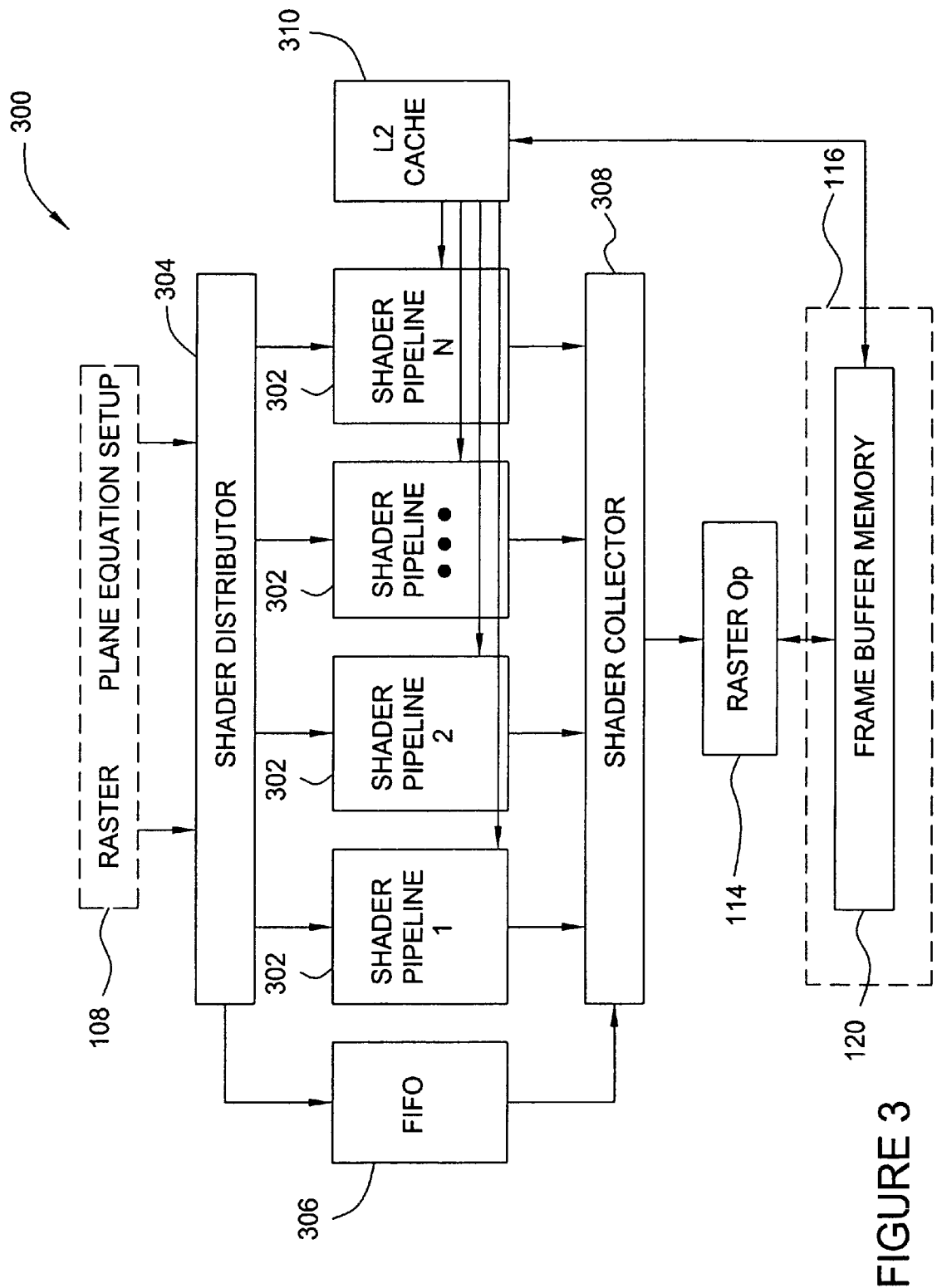
FIG. 3 is a high-level block diagram of a shader architecture having multiple shader pipelines and that is in accord with the principles of the present invention.

FIG. 3 is a high-level block diagram of a shader processor 300 that can be used to practice the principles of the present invention. The shader processor 300 converts the rasterized pixel data (which includes raw X, Y per fragment and plane equations for per-vertex attributes such as color, depth, texture, coordinates, etc) from the rasterizer 108 into appropriate color and depth values for each pixel that is to be sent to the frame buffer memory 120. To do so, the shader processor 300 executes large numbers of operations to resolve mathematical equations in response to API functions and in response to application program instructions to produce the desired color and depth values to form processed pixel data. In general, data is processed within the shader processor 300 in floating point format, e.g., 32 bit or 16 bit floating point, while data processed by subsequent modules, for example, the Raster Operations processor 114, is in fixed point format.

A copy of the application program instructions is typically stored in the frame buffer memory 120. Because there may be numerous application program instructions shared by multiple segments of data, and because the shader processor 300 has limited storage, the application program instructions are fetched from the frame buffer memory 120 and stored in a cache memory. When processing data, the shader processor 300 performs looping operations as required to execute the instructions specified by the program. After additional processing by the Raster Operations Processor, the processed pixel data is converted into frame pixel data that is optionally merged with video image data and then stored by the frame buffer interface 116 in the frame memory 120 (reference FIG. 1).

A notable feature of the shader processor 300 is its multiple shader pipelines 302. Each shader pipeline 302 can be individually programmed to perform mathematical and other processing operations on rasterized pixel data to produce processed pixel data. While the shader processor 300 is shown as having four shader pipelines 302, there could, in general, be from 1 to N shader pipelines 302, where N is an integer.

In the shader processor 300 the rasterized pixel data is distributed in the form of 2×2 pixel arrays called "quads." While the illustrated embodiment shader 300 operates on quads, this is not a requirement. Other shader processor embodiments may not process groups of pixels together at all, while other embodiments may use other numbers of pixels in a group, for example, three pixel groups called triads. In general, a pixel grouping can be from 1 to M, where M is an integer. However, in this example quads are used because the shader pipelines 302 are configured to perform one operation on each pixel of a quad for each clock.

The shader processor 300 also includes a shader distributor 304. One function of the shader distributor 304 is to distribute information from the rasterizer 108 (rasterized pixel data) to the various shader pipelines 302 so that they may process that data in accord with programming instructions. Beneficially this distribution is performed in a manner that provides for a balanced workload between the shader pipelines 302. That is, each shader pipeline 302 performs similar amounts of processing and none is preferred over the others. Another function of the shader distributor 304 is to process the data from the rasterizer 108 such that the shader pipelines 302 only receive what they require.

A portion of control data, referred to as state data, that is not used by the shader pipelines 302 is applied by the shader distributor 304 to a first in/first out buffer memory 306. Besides state data, the first in/first out buffer memory 306 also receives X-Y coordinate and pixel coverage data, which also do not go through the shader pipelines 302.

Because the shader pipelines 302 independently process rasterized pixel data, the outputs of the shader pipelines 302 have to be organized in such a manner that the resulting processed pixel data is properly matched with the pixels in the frame buffer memory 120 (by raster scan lines). The shader processor 300 therefore includes a shader collector 308 that receives the outputs of the shader pipelines 302 and the outputs of the first in/first out buffer memory 306, and that organizes the results of the shader processor operations to produce shaded pixel data for the Raster Operations Processor 114 (ROP).

The output of the shader collector 308 is applied via the Raster Operations Processor 114 (ROP) and the frame buffer interface 116 to the frame buffer memory 120. Since the shader pipelines 302 can all request data from the frame buffer memory 120 (through texture requests as described subsequently), the shader processor 300 includes an L2 cache memory 310 to assist in that process. It is through the texture requests that program instructions can be obtained from the frame buffer memory 120.

A main function of the shader distributor 304 is to distribute triangle plane equation information, the raster stream information, and the video image or images to the individual shader pipelines 302. Distributing data to the shader pipelines 302 is performed in two phases: segmentation and distribution. Because a shader pipeline 302 can perform operations only on a limited number of pixels at a time, the incoming data is chopped into groups called "segments." Segmentation is the process of forming segments. There are actually multiple reasons to segment, load-balancing being one, and workload size limitations being another. The number of pixels that can be handled by a single shader pipeline 302 is also limited by memory storage capacities of a shader register file (RAM) 444 (shown in FIG. 4) and of the shader gatekeeper 404 itself, as well as the need to send programming instructions down the shader pipelines (as is explained in more detail subsequently). The memory storage capacity of the shader register file 444 is an important aspect of the present invention and is discussed in more detail subsequently.

Distribution is the process of choosing one of the shader pipelines 302 and then feeding that shader pipeline 302 a complete segment, then feeding the next segment to the next shader pipeline 302, and so on. In the shader processor 300 (see FIG. 3) the segment distribution sequence is a simple round robin assignment between the operable shader pipelines 302. For instance if there are 4 shader pipelines 302 but only three are operable, then the distribution sequence is between the three operable shader pipelines 302. The first segment would go to shader pipeline 0, then to the next segment to shader pipeline 1, then to the next to shader pipelines 2, and then back to shader pipeline 0 and so on.

Figure 4:
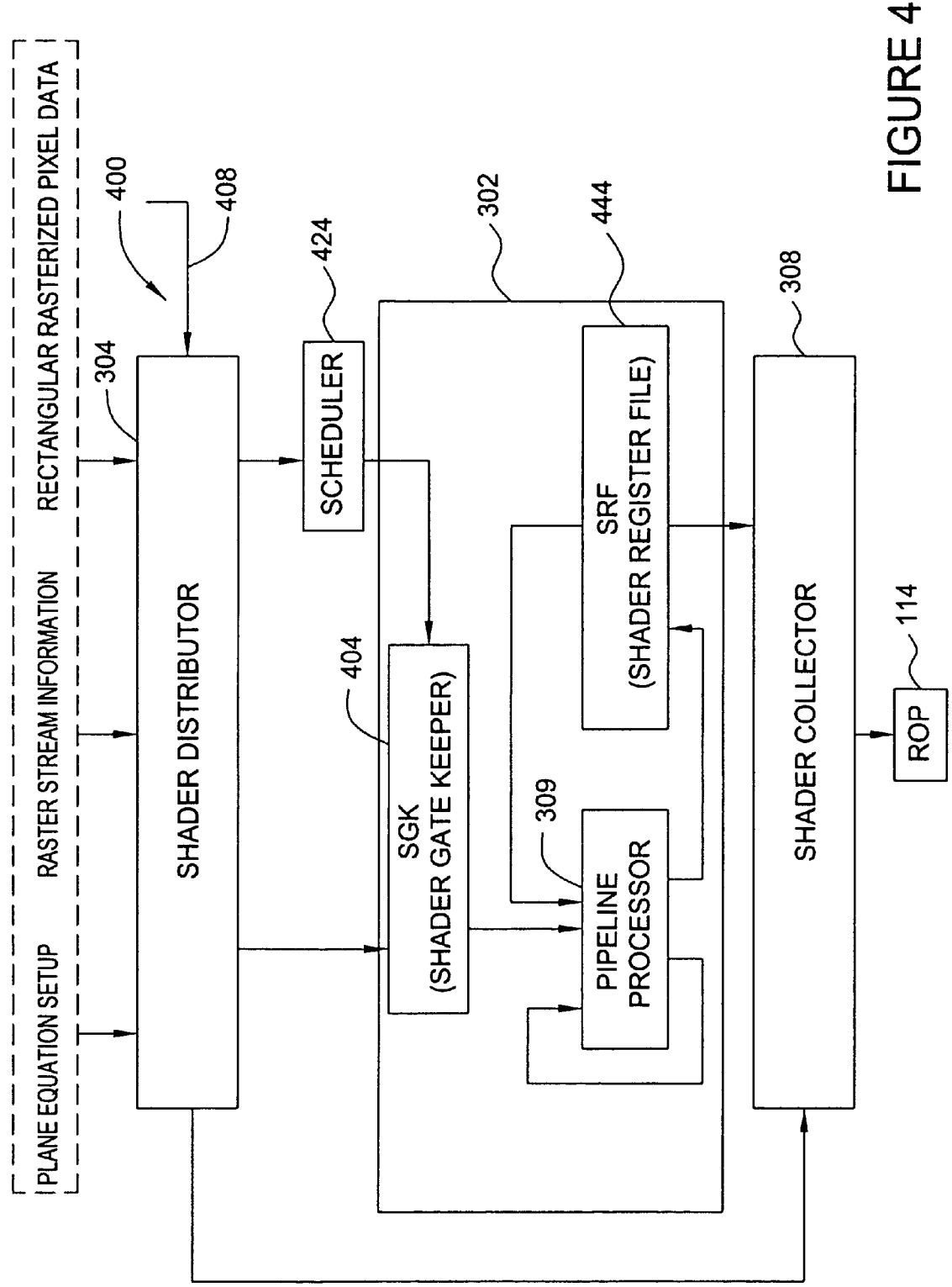
FIG. 4 is a block diagram of a shader processor that illustrates selected architectural features of the shader shown in FIG. 3.

Having been provided with an overview of the shader architecture (FIG. 3), more detail regarding the interactions of main features of the shader processor 300 will be helpful. Turning now to FIG. 4, a shader gatekeeper 404 receives segments and triangle equation information from the shader distributor 304. The shader gatekeeper 404 also receives program commands from a scheduler 424, which is described in more detail subsequently. The shader gate keeper 404 passes program commands and incoming segment data to a pipeline processor 309, also described in more detail subsequently, that processes the segment data in line with the program commands. Temporary data storage and output buffering is provided by the shader register file 444.

After data has been processed, the shader collector 308 collects the processed data from the shader register file 444 and combines that data with X, Y, and coverage data from the first in/first out buffer memory 306 (see FIG. 3) to form an organized shader pixel data packet. As noted previously, the result is sent to a Raster Operations Processor 114 that performs additional processing.

In some embodiments of the present invention the shader distributor 304 has functionality related to the initial programming of the first N (say 8) programming instructions. In such embodiments, the initial programming instructions pass through the shader pipeline to the scheduler 424 which then forms program commands for the shader pipeline texture processing stations. After the initial programming, or in embodiments in which the shader distributor 304 does not send initial program instructions, the scheduler 424 obtains the remaining (or all) programming instructions, forms programming commands, and applies them to the shader gatekeepers 404 (one for each shader pipeline 302). Since the scheduler 424 must co-ordinate the application of programming commands with the application of segments to the shader gatekeepers 404, the scheduler 424 is in communication with the shader distributor 304. This is beneficial because in multiple pipeline shaders 300 each pipeline must be individually programmed, which means the scheduler 424 must track which pipeline is running which set of instructions.

Figure 1:
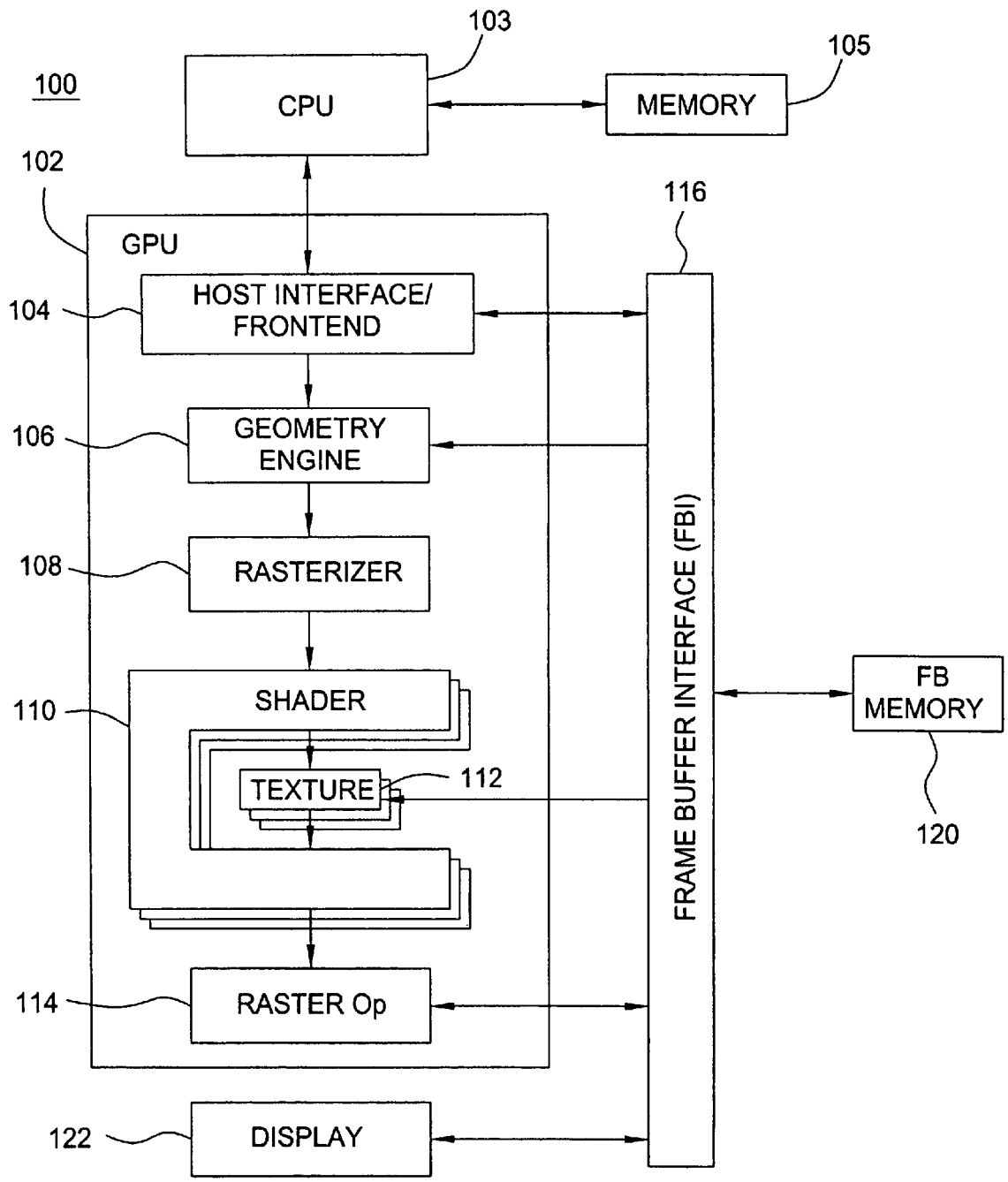
FIG. 1 schematically illustrates a prior art graphics system.

Referring now to FIGS. 1 and 3, a copy of all program instructions are beneficially stored in the frame buffer memory 120. To program a shader pipeline 302, the program instructions are applied as fragment programs: small programs that implement subsets of the complete graphical program. Fragment programs are used because the program instructions in the frame buffer memory 120 may not be in the proper format to implement the intended operations, and because a graphical program will usually be too large to be directly applied to a shader pipeline 302 because a shader pipeline 302 has limited resources.

To run a graphics program, fragment programs are formed by sequentially taking N, say 8, of the graphical program instructions at a time, converting them into a corresponding fragment program, and then applying that fragment program as a programming command to a shader pipeline 302. The programming command then programs the shader pipeline texture processing stations. A segment is then input and processed in accord with the fragment program. After the segment has been processed in accord with the first N (8) instructions, another N (8) instructions are obtained, another fragment program if formed, the shader pipeline is re-programmed, and the segment is processed in accord with the new fragment program. The process repeats until a segment has been fully processed in accord with the graphical programming instructions. A program counter tracks the graphical program execution steps.

Figure 5:
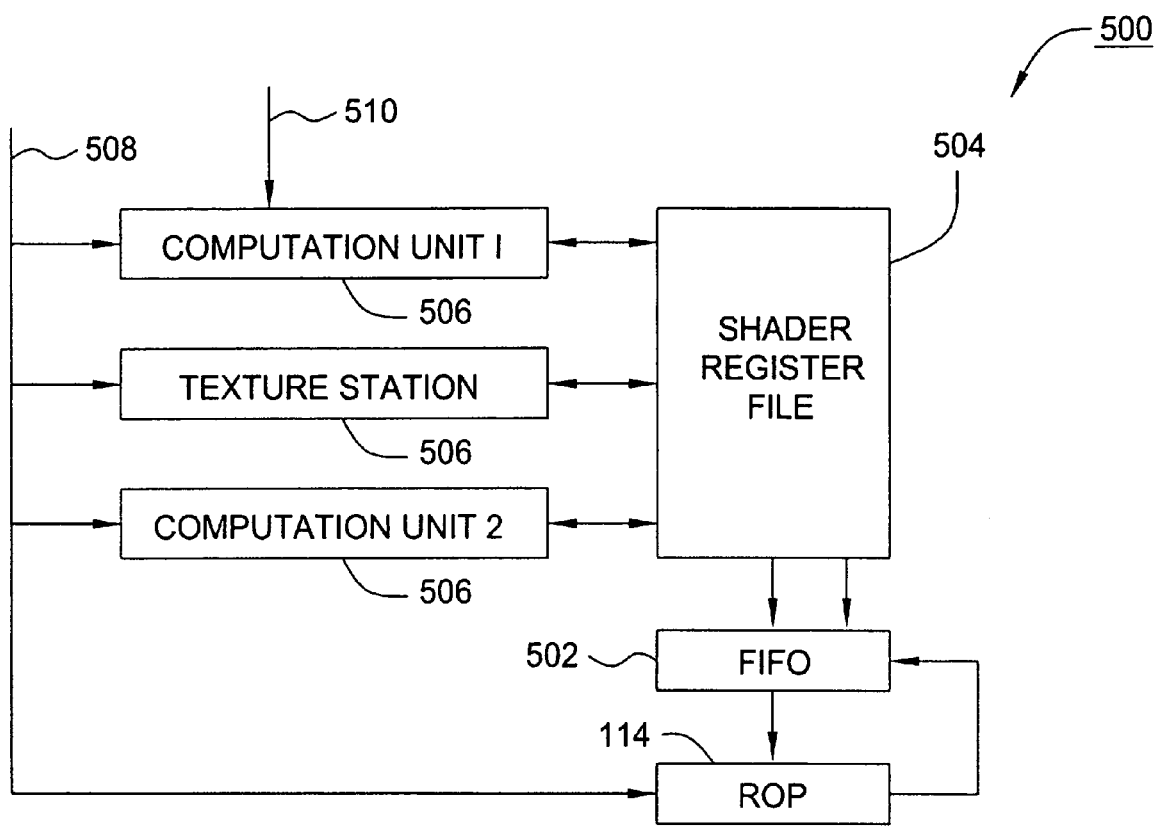
FIG. 5 illustrates a prior art shader architecture scheme in which a FIFO buffer is inserted between a shader processor and a Raster Operations Processor.
Figure 6:
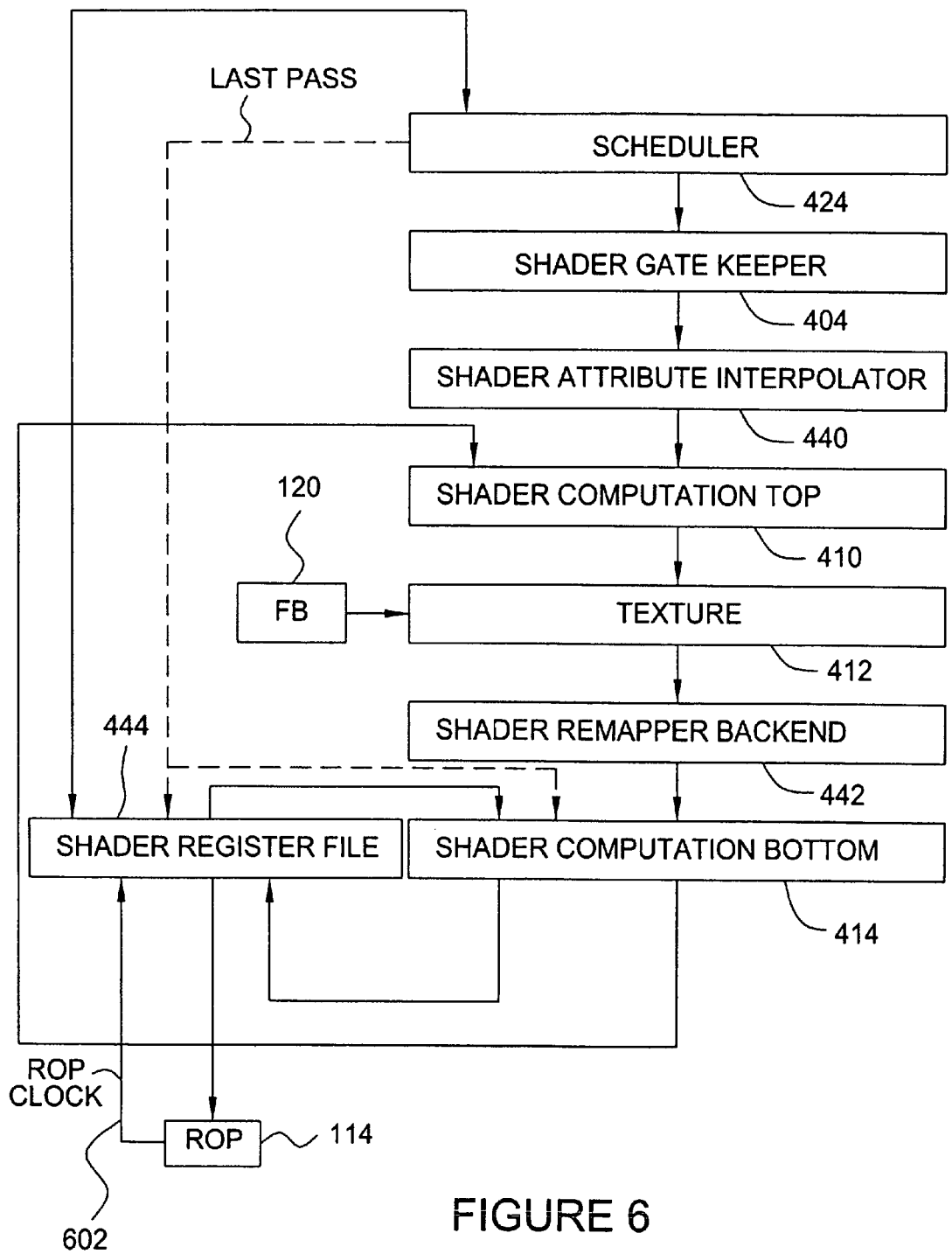
FIG. 6 illustrates interaction of a shader register file and other elements of the shader processor and the raster operations processor.

Having been provided with an overview of graphical processing (FIG. 1), an overview of the shader architecture (FIG. 3), with details regarding interactions of main features of the shader processor 300 (FIG. 4), and with an overview of shader pipeline programming, and with a prior art system that uses a FIFO buffer (FIG. 5), FIG. 6 will help explain the programming and the operations of a pipeline processor 309.

Shader pipeline programming is performed using programming commands that take the form of a word, referred to as a very long instruction word, or VLIW. The scheduler 424 forms and sends each pipeline 302 VLIW microcode instructions for each segment pass through the shader pipeline 302. The VLIW is applied to the shader gatekeeper 404, which passes that VLIW to a shader attribute interpolator 440, which passes it on to the various texture processing stations that are described below. The shader attribute interpolator 440 is responsible for producing interpolated attributes, which include texture coordinates, barycentric coefficients, and depth (z or w) to the incoming data. Interpolation in the shader attribute interpolator 440 is done using Sum-of-Products (SOP) arithmetic units.

As noted, the shader pipelines 302 are configured such that a VLIW can program texture processing stations of the pipeline processor 309 to perform various tasks. The various texture processing stations have specific functions that they can be programmed to perform. The ordering of programming functions is the task of a compiler (or interpreter) that compiles (or interprets) a graphical program in accord with the limitations and with the organization of the texture processing stations. An incoming VLIW is recognized as a program command, and not a segment, by the use of a program flag bit. An incoming VLIW is parsed by the programmable texture processing stations to isolate the command instructions that control their specific operations.

Referring to FIG. 6, the texture processing stations of a pipeline processor 309 include a shader computation top 410, a texture unit 412 and its shader re-mapper backend 442, and a shader computation bottom 414. Looping can occur from the shader computation bottom 414 to the shader computation top 410 to enable multiple processing passes through the texture processing stations.

The main responsibility of the shader computation top 410 is perspective correction of interpolated attributes incoming from a shader attribute interpolator 440. Such perspective correction demands reciprocation of 1/w (or q/w), to produce w (or w/q), followed by multiplication of the scalar interpolated attribute by w (or w/q). The shader computation top 410 can also perform various operations such as the scalar-reciprocation operation (RCP) and the 4-component multiplication operations MULR or MULH.

The texture unit 412 performs texture lookups from the frame buffer memory 120, which include accessing stored graphical programming instructions. Those results are remapped, if required, into proper form (16 or 32 bit floating point) for subsequent operations by the Shader Re-mapper and Backend 442. The properly formatted values are made available to the Shader Register File (SRF) 444 (via the shader computation bottom 414) and to the shader computation bottom 414. The texture unit 412 and the Shader Re-mapper and Backend 442 can execute all unpack (UP*) instructions, the optimized NRM instruction, and can compute the fog fraction. The texture unit 412 and the Shader Re-mapper and Backend 442 support execution of two separate instructions in parallel if one instruction is a texture, unpack, DDX, or DDY instruction, and the other is the other is the NRM instruction.

The shader computation bottom 414 performs arithmetic, multiplication, and scalar instructions: EX2, LOG 2, SIN, and COS. RCP and DIV instructions must happen in the shader computation bottom 414. The shader computation bottom 414 supports swizzling, input modifiers (neg, abs, nabs), and input clamping for all operands. The shader computation bottom 414 also supports output scaling and output clamping, and condition-code compare, update, swizzle, and writemask for all legal opcodes.

The shader computation bottom 414 also supports execution of two separate instructions in parallel on xy[z] and [z]w components, with independent input muxing, swizzling, and modifiers; condition code generation and testing; and output scaling and clamping. The only restriction (beyond register limits) is that the two parallel instructions cannot depend on each other (data dependencies).

A brief list of functions performed by each shader processing station is as follows:

Shader computation Top 410: MOV, MUL, RCP, DIV Texture unit 412 (with the: Shader Re-mapper and Backend 442): DDX, DDY, NRM, TEX, TXP, TXD, TXB, TXL, UP*; and the Shader computation bottom 414: ADD, COS, DP*, DST, EX2, FLR, FRC, LIF, LG2, MAD, MAX, MIN, MOV, MUL, PK*, SEQ, SFL, SGE, SGT, SIN, SLE, SLT, SNE, STR.

As shown in FIG. 6, the shader register file 444 is in communication with the scheduler 424, and the texture unit 412 is in communication with the frame buffer memory 120. Graphical programming instructions from the frame buffer memory 120 are accessed by the texture unit 412, passed to the shader remapper backend 442, and from there the programming instructions are accessed by the scheduler 424.

The principles of the present invention are closely related to the shader register file 444. As shown in FIG. 6, the shader register file 444 is functionally in communication with the shader computation bottom 414 and with the raster operations processor 114. For convenience, the shader collector 308 is not shown in FIG. 6. Functionally, the data that passes from the shader register file 444 into the shader collector 308 eventually passes to the raster operations processor 114. The scheduler 424 can send a signal, either via hardware or software, to the shader register file and to the shader computation bottom 414 to signal that the pipeline processor 309 is performing a "last pass" of the data segment being processed by the pipeline processor 309.

During normal operation, which is before the last pass, the shader register file 444 is used as a register that temporarily stores values passed to it by the shader computation bottom 414. Program instructions taken from the frame buffer 120 by the texture 412 pass through the shader remapper backend 442 and is then passed to the scheduler 424 which makes a fragment program. Other data taken from the frame buffer 120 pass to the shader pipeline processing 309 stations as required.

During the last pass, after the pipeline processor 309 has completed its tasks, the resulting data functionally pass from a shader register file 444 to the raster operations processor 114. Depending on the actual configuration that is implemented, this can be done directly by the shader register file 444 or through the shader computational bottom 414. However, for convenience FIG. 6 shows a direct link between the shader register file 444 and the raster operations processor 114.

Figure 7:
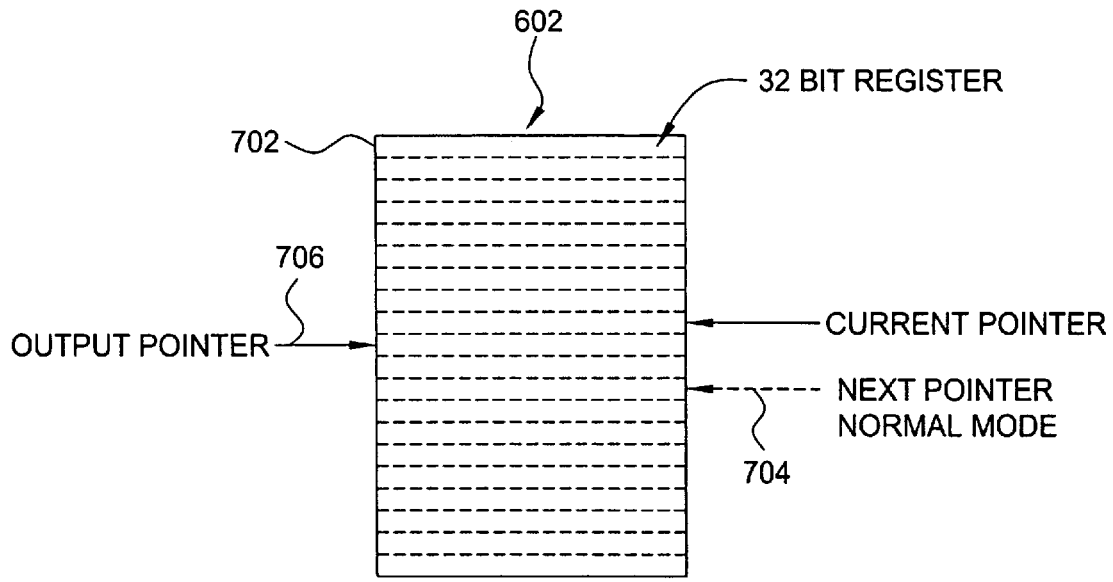
FIG. 7 illustrates how the shader register file is organized and used as a First-In First-Out buffer.

FIG. 7 illustrates the organization of the shader register file 444. The shader register file 444 is comprised of a plurality of registers 702 that are best understood as being stacked on top of each other. When the shader register file is being used to temporarily store data being used within the pipeline processor 309, that data (from the shader computation bottom 414) is stored in the various registers 702 by quads, one quad per register 702. Since the shader processor operates using floating point data, say 32 bit floating point, a register 702 is beneficially 128 bits long so it can store four 32 bit numbers per fragment of a quad. Stores and reads are performed using a "next pointer 704" that is controlled by processes within the shader 300. When quad data comes into (or leaves) a register 702, the register 702 being pointed to by the next pointer 704 receives the data (or sends the data) and then, on the next shader clock, the next pointer 704 moves to the register 702 that holds the next set of quad data that is to be stored (or read). In this manner the shader register file 444 temporarily stores shader processor data.

The shader register file 444 is also subject to actions of an output pointer 706 that is controlled by the raster operations process 114. When data is being read into the raster operations processor 114, a raster operations clock on line 602 causes the data in the register 702 pointed at by the output pointer 706 to be sent to the raster operations processor 114. When the next raster operations clock arrives the output pointer 706 drops down to the next register 702 and then data in that register is sent to the raster operations processor 114. Since the raster operations processor 114 accepts the data in a first-in first-out fashion, the outpoint pointer 706 only needs to continue stepping down until all of the data being read is applied to the raster operations processor 114. Thus, when being used to send data to the raster operations processor 114 the shader register file operates in a first-in first-out manner.

Thus the shader register file 444 operates in two modes. First it has a next pointer 704 that can be relocated anywhere within the shader register file 444 to store or retrieve data. Alternatively, when the raster operations processor 114 requests data, it sets its output pointer 706 at the start of the data that is to be received and then that data is clocked into the raster operations processor. The output pointer 706 then relocates to the next lower register 702.

Figure 8:
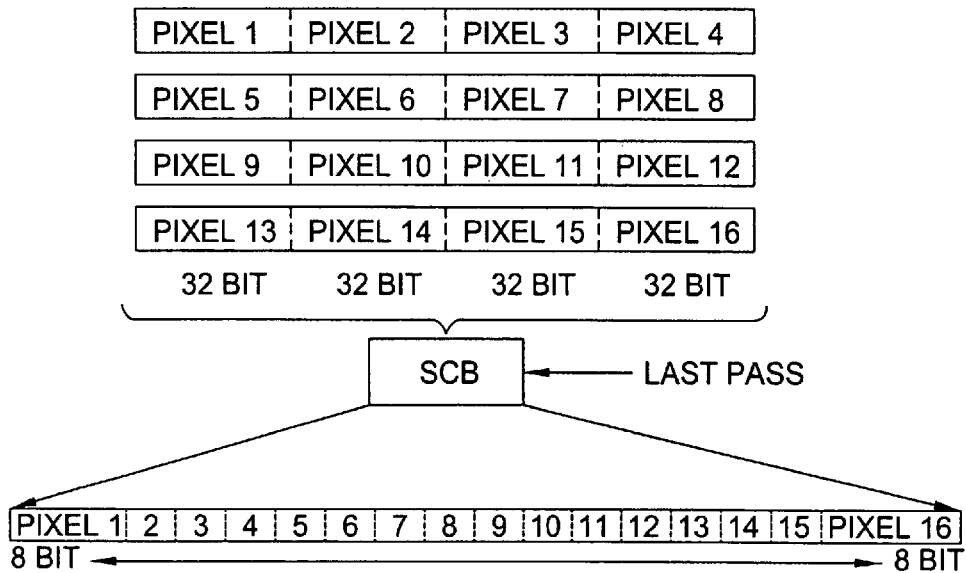
FIG. 8 illustrates hardware-based floating point to fixed point conversion.

In addition to having a dual mode shader register file 444, the shader pipeline 302 performs automatic hardware-based data conversions and packing. Returning now to FIG. 6, when the scheduler 424 commands a last pass, either in software or in hardware, after all data is processed and the final 32-bit floating point results are obtained, that data is hardware converted into (for example) 8-bit fixed point format. This is shown in FIG. 8. As shown, four registers 702, each having four 32-bit floating point values for pixels labeled pixel 1 through pixel 16 (four quads), are passed through the shader computation bottom 414, which hardware converts the floating point 32-bit floating point into sixteen 8-bit pixels. Those sixteen 8-bit pixels are stored in a single register file 702. Thus, in the last pass, while at the beginning all of the registers 702 may be filled with data, after hardware conversion, only one-quarter of the registers 702 contain data. By making the bottom quarter of the shader register file 444 contain the 8-bit fixed point formatted data, and by moving the output pointer 706 (see FIG. 7) to point to the top register 702 of the last quarter, the raster operations processor can clock data out of the shader register file 444. This process of storing multiple fixed point formatted data into a register is referred to as packing data.

Furthermore, since three quarters of the shader register file 444 are now free to accept data, a new segment can begin being processed. As the output pointer drops down, the previously pointed to register 702 can then be used to process the new segment. Eventually, when the raster output processor 114 drains the shader register file 444 all of the registers can contain data for a new segment of data.

While various embodiments have been described above, it should be understood that they have been presented by way of example only, and not limitation. The foregoing references to specific number, for example the use of quads are for purposes of explanation and illustration only. Thus, the breadth and scope of a preferred embodiment should not be limited by any of the above described exemplary embodiments, but should be defined only in accordance with the following claims and their equivalents.

The invention claimed is:

1. A shader processor, comprising:
   a first pipeline shader processing station for processing data;
   a first pipeline shader register file that operates in a first mode or in a second mode,
   wherein, in the first mode, the first pipeline shader register file is configured to store data being processed by the first shader processing station using a first pointer that responds to a first clock, and
   wherein, in the second mode, the first pipeline shader register file transmits data to a subsequent processing station that is configured to relocate a second pointer to one or more registers in the first shader register file, sequentially, in order to request data stored in the first pipeline shader register file, the second pointer being responsive to a second clock transmitted by the subsequent processing station.

2. A shader processor according to claim 1, further including a scheduler for applying graphics commands to said first pipeline shader processing station.

3. A shader processor according to claim 2, wherein said first pipeline shader processing station converts data when commanded by said scheduler.

4. A shader processor according to claim 3, wherein said scheduler commands conversion during a last pass of data through said first pipeline shader processing station.

5. A shader processor according to claim 3, wherein said first pipeline shader processing station packs data to fill a register of said first pipeline shader register file.

6. A shader processor according to claim 5, wherein the second pointer is relocated to a first register of the packed data, and the first shader register file receives additional data into registers in the first shader register file that do not store the packed data.

7. A shader processor according to claim 1, wherein said subsequent processing station is a raster operations processor.

8. A shader processor according to claim 1, wherein data being processed by said first pipeline shader processing station is in floating point format.

9. A shader processor according to claim 8, wherein said first pipeline shader register file stores data in fixed point format when said first pipeline shader register file is in the second mode.

10. A shader processor according to claim 1, wherein said first pipeline shader processing station converts data between at least two different numerical formats.

11. A shader processor according to claim 1, wherein the first shader pipeline register file receives additional data into a register after the second pointer is used to output the data stored in the register to the subsequent processing station and after the second pointer is relocated to the subsequent register.

12. A computer system, comprising:
a central processing unit for running an application program that causes the central processing unit to produce graphic data; and
a graphics processing unit for converting said graphic data into frame buffer pixel data, said graphics processing unit including a shader processor having:
a first pipeline shader processing station for processing graphic data, said first pipeline shader processing station being configured to convert data between at least two different numerical formats, and
a first pipeline shader register file that operates in a first mode or in a second mode,
wherein, in the first mode, the first pipeline shader register file is configured to store graphic data being processed by the first shader processing station using a first pointer that responds to a first clock, and
wherein, in the second mode, the first pipeline shader register file transmits data to a subsequent processing station that is configured to relocate a second pointer to one or more registers in the first shader register file, sequentially, in order to request data stored in the first pipeline shader register file, the second pointer being responsive to a second clock transmitted by the subsequent processing station.

13. A computer system according to claim 12, wherein the shader processor further includes a scheduler for applying graphics commands to said first pipeline shader processing station.

14. A computer system according to claim 13, wherein said first pipeline shader processing station converts data when commanded by said scheduler.

15. A computer system according to claim 14, wherein said scheduler commands conversion of data during the last pass of data through said first pipeline shader processing station.

16. A computer system according to claim 14, wherein said first pipeline shader processing station packs data to fill a register of said first pipeline shader register file.

17. A computer system according to claim 16, wherein the second pointer is relocated to a first register of the packed data, and the first shader register file receives additional data into registers in the first shader register file that do not store the packed data.

18. A computer system according to claim 12, wherein said subsequent graphics processing station is a raster operations processor.

19. A computer system according to claim 12, wherein graphic data being processed by said first pipeline shader processing station is in floating point format.

20. A computer system according to claim 19, wherein said first pipeline shader register file stores data in fixed point format when said first pipeline shader register file operates in the second mode.

21. A computer system according to claim 12, wherein the first shader pipeline register file receives additional graphic data into a register after the second pointer is used to output the data stored in the register to the subsequent processing station and after the second pointer is relocated to the subsequent register.

22. A graphics processing integrated circuit, comprising:
a front end for receiving raw graphic data;
a geometry engine for organizing said raw graphics data into geometric primitives;
a rasterizer for converting said geometric primitives into rasterized pixel data; and
a shader processor for shading said rasterized pixel data, said shader including:
a first pipeline shader processing station for processing rasterized pixel data, and
a first pipeline shader register file that operates in a first mode or in a second mode,
wherein, in the first mode, the first pipeline shader register file is configured to store rasterized pixel data being processed by the first shader processing station using a first pointer that responds to a first clock, and
wherein, in the second mode, the first pipeline shader register file transmits data to a subsequent processing station that is configured to relocate a second pointer to one or more registers in the first shader register file, sequentially, in order to request data stored in the first pipeline shader register file, the second pointer being responsive to a second clock transmitted by the subsequent processing station.

23. A graphics processing integrated circuit according to claim 22, wherein data being processed by said first pipeline shader processing station is in floating point format.

24. A graphics processing integrated circuit according to claim 22, wherein the shader processor further includes a scheduler for applying graphics commands to said first pipeline shader processing station.

25. A graphics processing integrated circuit according to claim 24, wherein said first shader pipeline processing station packs data to fill a register of said first pipeline shader register file when commanded by said scheduler, said second pointer is relocated to a first register of the packed data, and the first shader register file receives additional data into registers in the first shader register file that do not store the packed data.

26. A graphics processing integrated circuit according to claim 22, wherein the first shader pipeline register file receives additional rasterized pixel data into a register after the second pointer is used to output data stored in the register to the subsequent processing station and after the second pointer is relocated to the subsequent register.

* * * * *

UNITED STATES PATENT AND TRADEMARK OFFICE
CERTIFICATE OF CORRECTION

| | | |
|---|---|---|
| PATENT NO. | : 7,821,520 B1 | Page 1 of 1 |
| APPLICATION NO. | : 11/009471 | |
| DATED | : October 26, 2010 | |
| INVENTOR(S) | : Bastos et al. | |

It is certified that error appears in the above-identified patent and that said Letters Patent is hereby corrected as shown below:

Column 11, line 42, please replace "conversion of data" with -- conversion during --.

Signed and Sealed this
Seventeenth Day of May, 2011

David J. Kappos
*Director of the United States Patent and Trademark Office*